United States Patent [19]
Loewrigkeit et al.

[11] 4,404,258
[45] Sep. 13, 1983

[54] COLOR STABILIZED WATER-DISPERSED POLYURETHANE COATING ON VINYL SURFACES

[75] Inventors: Peter Loewrigkeit, Wyckoff; Shmuel Dabi, Highland Park, both of N.J.

[73] Assignee: Witco Chemical Corporation, New York, N.Y.

[21] Appl. No.: 362,330

[22] Filed: Mar. 26, 1982

Related U.S. Application Data

[63] Continuation-in-part of Ser. No. 191,729, Sep. 29, 1980, abandoned.

[30] Foreign Application Priority Data

Jul. 21, 1981 [CA] Canada .................................. 383058

[51] Int. Cl.³ .......................... B32B 27/40; B05D 3/02
[52] U.S. Cl. ............................... 428/424.6; 427/393.5; 525/453; 525/454; 525/457

[58] Field of Search .................. 427/393.5; 428/424.6; 525/454, 457, 453

[56] References Cited

U.S. PATENT DOCUMENTS 3,923,713  12/1975  Hermann ..................... 428/424.6 X
4,206,255   6/1980  Wenzel et al. .................. 427/393.5

Primary Examiner—Michael R. Lusignan
Attorney, Agent, or Firm—Wallenstein, Wagner, Hattis, Strampel & Aubel

[57] ABSTRACT

A polyurethane coated polyvinyl chloride or copolymer which resists discoloration is provided by coating the substrate surface with an aqueous dispersed polyurethane treated with a mono-acid halide, mono-acid anhydride, carbethoxy cyclic imide or monoisocyanate. The coated composite even when subjected to temperatures in excess of 100 degrees C. for extended periods resists discoloration and remains thermo-color stable with extended use.

8 Claims, No Drawings

COLOR STABILIZED WATER-DISPERSED POLYURETHANE COATING ON VINYL SURFACES

This is a continuation-in-part of copending application Ser. No. 191,729, filed Sept. 29, 1980, now abandoned.

FIELF OF THE INVENTION

This invention relates to aqueous based polyurethane coatings on a polyvinyl chloride or co-polymer substrate. More particularly, this invention relates to providing an aqueous based polyurethane coating on the polymer substrate wherein the composite resists discoloration at temperatures of 100° to 150° C.

BACKGROUND AND DISCUSSION

Generally, films of aqueous polyurethane dispersions tend to become discolored on heat aging at temperatures up to about 150° C., but are quite color stable at temperatures up to about 70° to 100° C. Vinyl chloride polymers on the other hand, are generally color stable, even at temperatures of 150° C. for extended periods. When a vinyl chloride polymer is coated with an aqueous based (water soluble or dispersible) polyurethane, however, the composite discolors at temperatures as low as 70° C.

In Hermann, U.S. Pat. No. 3,923,713, granted Dec. 2, 1975, it is proposed to add organic monoisocyanate, an antioxidant and a U.V. absorber to a urethane adhesive for plastic bonding to prevent gas-fade yellowing. Such use achieved a certain level of stability for the adhesive.

The art desired that a urethane as a coating be provided to a polyvinyl chloride or copolymer surface, which coating as well as the substrate would not discolor with extended use, or when subjected to high temperatures during and after the manufacturing process.

It is therefore a principal object of the present invention to provide a urethane coated polyvinyl chloride or copolymer in which discoloration at temperatures up to about 150° C. is not a problem.

It is another object of the present invention to provide an improved method for coating a polyvinyl chloride or co-polymer surface with a polyurethane latex.

It is a further object of the present invention to provide certain treated urethanes in aqueous dispersion which can readily be coated on a polyvinyl chloride or co-polymer surface, and which are practical and aesthetically acceptable in use.

DESCRIPTION OF THE PREFERRED EMBODIMENTS

Broadly speaking, the present invention may be said to comprise adding a compound selected from:
(1) a mono-acid halide;
(2) an acid anhydride;
(3) a carbethoxy cyclic imide; and
(4) a mono-isocyanate;
to an aqueous urethane latex, and applying same to a polyvinyl chloride surface, to produce a urethane coated polyvinyl chloride or copolymer composite which is resistant to thermal discoloration. The foregoing compounds are amine capping or blocking agents and represent those compounds which are effective in the present invention. The mechanism involved is not completely understood, however, it is considered that one function of these compounds is the capping of whatever amines are present in the polyurethane latex.

In another aspect, the present invention may be said to comprise a method for providing the present color-stable urethane coated vinyl chloride polymer, whereby a water soluble or dispersible isocyanate terminated prepolymer is dispersed in water and treated with a mono acid halide, monoacid anhydride, a monoisocyanate, a carbethoxy cyclic imide, or mixtures thereof. This latex product is then coated onto a polyvinyl chloride or copolymer surface and cured thereon.

In another aspect, the present invention may be said to comprise a method for providing a non-discoloring urethane coated polyvinyl chloride surface, said method comprising dispersing an isocyanate terminated prepolymer in water and rapidly adding less than a stoichiometric amount of a polyamine as a chain-extender and then treating the resultant product with one or mixtures of a mono-acid halide, monoacid anhydride, carbethoxy cyclic imide and mono-isocyanate. The final latex is applied to a polyvinyl chloride surface and cured on said surface to form a color stabilized urethane coated polymer composite. Although the polyamine competitively reacts with the -NCO much faster than water, when the -NCO terminated prepolymer is dispersed in water some amine terminated urethane is formed regardless of the rapid addition of the amine chain extender.

The compounds useful pursuant to the invention, to be added to the water dispersed polyurethane, include (1) a mono-acid halide, preferably a mono-acid chloride, such as para-toluene-sulfonyl chloride, but also benzoyl chloride, butyryl chloride, hexanoyl chloride, and the like; (2) an acid anhydride, such as the mono-acid anhydrides, including acetic anhydride, propionic anhydride, butyric anhydride, and benzoic anhydride; (3) a carbethoxy cyclic imide, particularly the substituted imides and most preferably aryl mono-imides, such as N-carbethoxy phthalimide; and (4) a mono-isocyanate, both alkyl and aryl isocyanates such as phenyl isocyanate, p-chlorophenyl isocyanate, cyclohexyl isocyanate, octadecyl isocyanate and the like. Also, the reaction product of polyisocyanate with a mono-alcohol to form a monoisocyanate. The aforesaid compounds are effective in very small amounts of from about 1 to 5% by weight and as low as 1 to 3% by weight based on the weight of the polyurethane in the latex. Larger quantities do not appear to impart any additional advantage.

By the present invention, both the polyvinyl chloride or copolymer substrate and the polyurethane to be coated thereon are relatively thermally color-stable. However, when the polyurethane is not treated as described herein, the coated composite is not color stable. It is indeed surprising and unexpected that only certain capping compounds as herein described are effective in the present color-stable composite.

To prepare the polyurethanes, any polyisocyanate may be used. Typical aromatic polyisocyanates include m-phenylene diisocyanate, p-phenylene diisocyanate, polymethylene polyphenyl isocyanate, 2,4-toluene diisocyanate, 2,6-toluene diisocyanate, dianisidine diisocyanate, ditolylene diisocyanate, naphthalene-1,5-diisocyanate, diphenylene -4,4'-diisocyanate; such as xylylene-1,3-diisocyanate, bis(4-isocyanatophenyl) methane, bis(3-methyl-4-isocyanatophenyl) methane, 4,4'-diphenylpropane diisocyanate; and aliphatic diisocyanates, such as isophorone diisocyanate, hexamethylene diisocyanate, and 4,4'-(isocyanato cyclohexyl) methane.

Preferred aromatic polyisocyanates used in the practice of the invention are 2,4- and 2,6-toluene diisocyanates and methylene bridged polyphenyl polyisocyanate mixtures which have functionality of from about 2 to about 4.

The polyhydroxyl compounds or polyols can be either low or high molecular weight materials and in general will have average hydroxyl values as determined by ASTM designation No. E-222-67. Method B, between about 1000 and 10, and preferably between about 500 and 50. The term "polyol" is meant to include materials having the average of two or more hydroxyl groups per molecule.

The polyols include low molecular weight diols, triols and higher alcohols, low molecular weight amide containing polyols and higher polymeric polyols such as polyester polyols, polyether polyols and hydroxy-containing acrylic interpolymers.

The low molecular weight diols, triols and higher alcohols useful in the instant invention are known in the art. They have hydroxyl values of 200 or above, usually within the range of 1500 to 200. Such materials include aliphatic polyols, particularly alkylene polyols containing from 2 to 18 carbon atoms. Examples include ethylene glycol, 1,4-butanediol, 1,6-hexanediol; cycloaliphatic polyols such as 1,2-cyclohexanediol, cyclohexane dimethanol and higher alcohols include trimethylol propane, dimethylol propionic acid, glycerol and oxyalkylated glycerol.

When flexible and elastomeric properties are desired, the partially reacted NCO-containing polymer should preferably contain at least a portion of a higher molecular weight polymeric polyol. Such a polymeric polyol should be predominantly linear (that is, absence of trifunctional or higher functionality ingredients) to avoid gelling of the resultant polymeric product and should have a hydroxyl value of 200 or less, preferably within the range of about 150 to 30.

Any suitable polyalkylene ether polyol may be used including those which have the following structural formula:

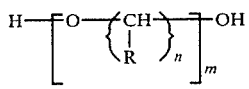

where the substituent R is hydrogen or lower alkyl including mixed substituents, and n is typically from 2 to 6 and m is from 2 to 100 or even higher. Included are poly(oxytetramethylene) glycols, poly(oxyethylene) glycols, polyoxypropylene glycols and the reaction product of ethylene glycol with a mixture of propylene oxide and ethylene oxide.

Also useful are polyether polyols formed from the oxyalkylation of various polyols, for example, glycols such as ethylene glycol, 1,6-hexanediol, Bisphenol A, and the like or higher polyols, such as trimethylol propane, pentaerythritol and the like. Polyols of higher functionality which can be utilized as indicated can be made, for instance, by oxyalkylation of compounds such as sorbitol or sucrose. One commonly utilized oxyalkylation method is by reacting a polyol with an alkylene oxide, in the presence of an acidic or basic catalyst.

Besides poly(oxyalkylene) glycols, any suitable polyhydric polythioether may be used, for example, the condensation product of thioglycol or the reaction product of a polyhydric alcohol, such as disclosed herein for the preparation of hydroxyl polyesters, with thioglycol or any other suitable glycol.

Polyester polyols are preferred as a polymeric polyol component in the practice of the invention. The polyester polyols can be prepared by the polyesterification of organic polycarboxylic acids or anhydrides thereof with organic polyols. Usually, the polycarboxylic acids and polyols are aliphatic or aromatic dibasic acids and diols.

The diols which are usually employed in making the polyester include alkylene glycols, such as ethylene glycol and butylene glycol, neopentyl glycol and other glycols such as hydrogenated Bisphenol A, cyclohexane diol, cyclohexane dimethanol, caprolactone diol (for example, the reaction product of caprolactone and ethylene glycol), hydroxyalkylated bisphenols, polyether glycols, for example, poly(oxytetramethylene) glycol and the like. However, other diols of various types and, as indicated, polyols of higher functionality can also be utilized. Such higher polyols can include, for example, trimethylol propane, trimethylol ethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

The acid component of the polyester preferably consist primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, and other dicarboxylic acids of varying types. Larger amounts of a monobasic acid such as benzoic acid may be combined with sucrose to make effectively polyfunctional sucrose benzoate. This polyfunctional material can then be reacted with various other ingredients and isocyanates to form polyurethanes having enhanced durability. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutarate can be used. It is preferred that the polyester include an aliphatic dicarboxylic acid as at least part of the acid component.

The amines which can be employed in chain extending the present aqueous polyurethanes can be primary or secondary (having an available H) diamines or polyamines in which the radicals attached to the nitrogen atoms can be saturated or unsaturated, aliphatic alicyclic, aromatic, aromatic-substituted aliphatic, aliphatic-substituted aromatic or heterocyclic. Mixed amines in which the radicals such as, for example, aromatic and aliphatic an be employed. Exemplary of suitable aliphatic and alicyclic diamines are the following: ethylene diamine, 1,2-propylene diamine, 1,8-menthane diamine, isophorone diamine, propane-2,2-cyclohexyl amine, methane-bis-(4-cyclohexyl amine), and

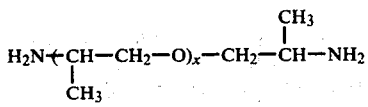

where x=1 to 10.

Aromatic diamines such as the phenylene diamines and the toluene diamines can be employed. Exemplary of the aforesaid amines are: o-phenylene diamine and p-tolylene diamine. N-alkyl and N-aryl derivatives of the above amines can be employed such as, for example, N,N'-dimethyl-o-phenylene diamine, N,N'-di-p-tolyl-m-phenylene diamine, and p-aminodiphenylamine.

Polynuclear aromatic diamines can be employed in which the aromatic rings are attached by means of a valence bond, such as, for example 4,4'-biphenyl diamine, methylene dianiline and monochloromethylene dianiline.

As known in the art, the amount of polyamine may be up to 100% equivalent of NCO groups present in the prepolymer, but is preferred to employ less than the stoichiometric amount. Excess polyamine may be added but serves no useful purpose in this invention.

Vinyl substrates useful pursurant to the present invention include the broad range of vinyl chloride polymers and copolymers with vinyl acetate or acrylic acid, for instance or vinylidene chloride, and the like, as well known in the art, Surprisingly, it was found that polyvinyl chloride and copolymer substrates which were not first heat stabilized were nevertheless rendered color stable by the urethane coating of the present invention.

When the aforedescribed coating is applied to the polyvinyl chloride or copolymer substrate, with or without the known stabilizers such as the cadmium/barium type, for instance, no significant discoloration occurs and both the coating and substrate remain color stable with heat aging, as shown in the following specific examples.

EXAMPLE I

Hydroxy terminated poly hexanediol adipate, having an OH number of 112, weighing 199 g was melted at 80° C. Dimethylol propionic acid, 24.6 g, and 4,4'-di-(isocyanato cyclohexyl)-methane, 152 g, were added and the temperature was reduced to 60° C. Acetone, 95.3 g and triethylamine 18.6 g were charged. The mixture was stirred at 65° C. for 4 hours, to give a prepolymer with 3.3% free NCO. The prepolymer was dispersed in 750 g water and further chain extended with 7.5 g ethylenediamine.

A. A sheet of dried film cast from the foregoing dispersion did not become discolored after aging for 5 days at 100° C. in a convection oven.

B. A sheet of white plasticized P.V.C. which also did not discolor after aging for 5 days at 100° C. in a convection oven, was coated with the resulting latex, then aged at 100° C. After 24 hours, the composite turned yellow, and after 4 days it turned to purple.

C. The above latex was treated with 9.4 g of phenyl isocyanate (PhNCO) (2.3% based on solid polymer), at room temperature for one hour and coated on the same P.V.C. used in B above. No discoloration was noted after aging for 5 days at 100° C. Slight yellowing appeared only after 7 days at this temperature.

EXAMPLE II

A latex as in Example I was coated on light brown P.V.C. and aged at 100° C. for seven days. The light color became very dark. When the latex was treated, as in Example I, with 1.0% p-toluene-sulfonyl)chloride (in place of the PhNCO), no change in color was noted after 8 days at 100° C.

EXAMPLE III

Toluene diisocyanate (TDI) was partially reacted with methanol (1:1 molar ratio) to leave one free NCO group capable of reacting with amine end groups. When added to the urethane latex in Example I, this product reduced discoloration of the vinyl composite as effectively as PhNCO.

EXAMPLE IV

Example I was repeated, substituting 1% N-carbethoxy-phthalimide for the PhNCO. The treated urethane was coated onto a copolymer of vinyl chloride and vinyl acetate. The coated substrate was tested at 100° C. for seven days. No significant discoloration was observed.

EXAMPLE V

Example I was repeated, adding 10 g of adipic acid dihydrazide and 7.5 g ethylenediamine to chain-extend the dipersed polyurethanes. The resultant latex was treated with butyric anhydride in place of phenyl isocyanate and coated on a P.V.C. substrate. The composite resisted thermal discoloration as in Example I.

Other known capping compounds, such as ethylene carbonate, phenylchloroformate, and butyrolactone, for instance, were added to the latex of Example I. After testing at 100° C. for several days, both the coating and the substrate (composite) had discolored in each case.

In addition to the components mentioned above, the compositions ordinarily contain optional ingredients, including any of the various pigments ordinarily utilized in coatings of this general glass. In addition, various fillers, plasticizers, anti-oxidants, flow control agents, surfactants, cross-linking agents and other such formulating additives can be employed in many instances.

The urethane compositions herein can be applied by any conventional method, including brushing, dipping, flow coating electrodeposition, electrostatic spraying, and the like, but they are most often applied by air spraying. The usual spray techniques and equipment are utilized. The coatings of the present invention can be applied over virtually any vinyl substrate.

As many widely different embodiments of this invention may be made without departing from the spirit and scope thereof, it is to be understood that this invention is not to be limited to the specific embodiments except as defined in the appended claims.

What is claimed is:

1. A color stabilized polyurethane coated polyvinyl chloride surface, said polyurethane and said polyvinyl chloride each of which is substantially color stable at about over 100° C. but which become discolored at about 100° C. when combined, comprising:
a said polyvinyl chloride or copolymer surface; and
a coating cured on said surface, said coating comprising a water-dispersed latex of said polyurethane
said dispersed polyurethane being treated with a compound selected from the group consisting essentially of a mono-acid halide, mono-acid anhydride and carbethoxy cyclic imide.

2. The coated surface of claim 1, where said compound is present in an amount of from about 1 to 3% by weight based on the weight of the latex.

3. The coated surface of claim 1, wherein said compound is N-carbethoxy phthalimide.

4. The coated surface of claim 1, wherein said compound is p-toluene sulfonyl chloride.

5. A method for preparing a color stabilized polyurethane coated polyvinyl chloride or copolymer surface, said polyurethane and said polyvinyl chloride or copolymer each of which is substantially color stable at about over 100° C. but which become discolored at about 100° C. when combined, said method comprising:

a. preparing a water dispersion or latex of said polyurethane.

b. treating the dispersed polyurethane of step (a) with a compound selected from the group consisting of a mono-acid halide, mono-acid anhydride and carbethoxy cyclic imide.

c. applying the product of step (b) to said polymer surface; and d. drying the coating on said surface, to form a color-stable polyurethane coated product.

6. The method of claim 5, wherein said (b) compound is present in an amount of 1 to 3% by weight based on the weight of the latex.

7. The method of claiam 5, wherein the compound of step (b) is a carbethoxy mono-cyclic imide.

8. The method of claim 5, wherein the compound of step (b) is p-toluene sulfonyl chloride.

* * * * *